United States Patent [19]
Laramay et al.

[11] Patent Number: 5,386,874
[45] Date of Patent: Feb. 7, 1995

[54] PERPHOSPHATE VISCOSITY BREAKERS IN WELL FRACTURE FLUIDS

[75] Inventors: Steven B. Laramay, Marlow; Ronald J. Powell, Duncan; Samuel D. Pelley, Rush Springs, all of Okla.

[73] Assignee: Halliburton Company, Duncan, Okla.

[21] Appl. No.: 148,486

[22] Filed: Nov. 8, 1993

[51] Int. Cl.$^6$ ............................................. E21B 43/267
[52] U.S. Cl. ..................................... 166/300; 166/308
[58] Field of Search ............................... 166/300, 308; 252/8.551

[56] References Cited

U.S. PATENT DOCUMENTS

| | | | |
|---|---|---|---|
| 3,816,151 | 6/1974 | Podlas | 166/308 X |
| 3,960,736 | 6/1976 | Free et al. | 252/8.551 |
| 3,990,978 | 11/1976 | Hill | 252/8.551 |
| 4,552,674 | 11/1985 | Brown et al. | 252/8.551 |
| 4,741,401 | 5/1988 | Walles et al. | 166/300 |
| 4,747,728 | 5/1988 | Norris et al. | 405/263 |
| 5,007,481 | 4/1991 | Williams et al. | 166/308 X |
| 5,224,546 | 7/1993 | Smith et al. | 166/308 X |

OTHER PUBLICATIONS

Borchardt et al., "Oil-Field Chemistry, Enhanced Recovery and Production Stimulation," ACS Symposium Series 396, Amer. Chem. Soc., Washington, D.C. (1979), pp. 1-100.

Economides et al., "Reservoir Stimulation," Schlumberger Education Services, Houston, Texas (1987), pp. 4-9.

*Primary Examiner*—George A. Suchfield
*Attorney, Agent, or Firm*—Arnold, White & Durkee

[57] ABSTRACT

The present invention relates to: i) fracture fluid compositions for fracturing subterranean formations to enhance production of fluids from wells in which the viscosity breaker is one or more esters or amides of the perphosphate ion, and to: ii) fracturing processes using fracture fluids comprising esters or amides of the perphosphate ion.

8 Claims, No Drawings

PERPHOSPHATE VISCOSITY BREAKERS IN WELL FRACTURE FLUIDS

FIELD OF THE INVENTION

The present invention relates to production of natural fluids such as crude oil and natural gas from subterranean formations via wells drilled into the formation. Specifically, the invention relates to fracturing subterranean formations to stimulate production. More specifically, the invention relates to fracture fluid compositions and methods for using them.

BACKGROUND OF THE INVENTION

Natural fluids such as crude oil and natural gas residing in subterranean porous formations are produced by drilling wells into the formation. Ambient pressure in the formation generally drives the fluid into and up the well. Surface pumps are used to enhance flow.

It is common practice to stimulate recovery of fluids from subterranean porous formations by fracturing the porous formation to open new pathways for flow to the well. One commonly used technique for fracturing formations is hydrofracturing. To hydrofracture a formation, a fracture fluid is injected by a pump located on the surface above the well into the formation through a well-bore. The fracture fluid is pumped at a rate sufficient to build up pressure in the well. The pressure is transmitted to the fluid in the porous formation and induces fractures in the formation.

Pressurized fracture fluid flows into the formation through perforations in the steel pipe which lines the well. The perforations are formed in pipe sections adjacent to sectors of the formation to be fractured by explosive charges or by high pressure jets. The fractures initiate at the well-bore and propagate radially outward into the formation. Commonly, solid particles, called propping agents, are dispersed in the fracture fluid. The propping agent deposits into the fracture fissures and holds them open. Propping agents have sufficient compressive strength to withstand the pressure in the formation, but are not abrasive against the formation. Common propping agents include sand, sintered bauxite, and polymer resin coated proppants.

Fracture fluids are generally aqueous; because water is effective, accessible, and cheap. Commonly, thickeners, hydratable polymeric water gelling materials, are added to the water to increase the viscosity of the fracture fluid. Viscosification is required to reduce leakage from the fracture fissures during fracturing and to promote suspension of propping agents. Fracture fluids are subjected to high shear stresses as they are pumped through the well and into the formation. The intermolecular bonds of the thickening agent molecules in solution must be sufficiently strong to resist shear cleavage during the hydrofracturing process. Commercially used thickening agents include synthetic products, e.g., polyethylene oxides, polyacrylates, polyacrylamides and polyetherglycols, and natural polymers like starch, guar, cellullose derivatives, lignites, carrageenan, and locust bean gum. Cost and performance effectiveness of natural polysaccharide thickeners establish them as preferred thickeners. Guar gum, a galacto-mannan, and its derivatives are the most widely used thickeners. Cellulose derivatives including hydroxyethylcellulose and carboxymethylhydroxyethylcellulose are also commonly used.

Molecular weights of thickeners generally range from about 500,000 to 3,000,000. Typically, apparent viscosity of the fracture fluid at operating shear rates (about 170 reciprocal seconds in the wellbore annulus) is raised relative to water by a factor of 500 to 1000. This requires thickener concentrations ranging from 20 to 50 lbs. per 1000 gallons of water.

Wells are currently being drilled deeper than before, and consequently operating temperatures in fractured formations are increasing. Temperatures between 200° F. and 300° F. are commonly encountered in producing oil and gas wells. At higher temperatures, higher thickener loadings are required to achieve required viscosification. However, thickener loading levels have reached their practical limit in cost and pump-ability. This problem is solved by adding crosslinking agents to the fracture fluids. Crosslinking agents form linkages between thickener macromolecules as the fluid is pumped into the well. Crosslinking increases the viscosity of the fracture fluid, thus extending upward the effective working temperature of the thickeners.

Commercial high temperature crosslinking agents include polyvalent metal ions such as Cr(VI), Cr(III), Sb(V), Sb(III) Ti(IV), Al(III), Zr(IV), and also borate. The metal ions are associated with a suitable polydentate anion such as lactate. Zirconium(IV), titanium(IV) and borate ion are currently the preferred crosslinkers for high temperature service.

When fracturing is complete, the fracture fluid must be expelled from the fissures to allow resumption of oil or gas production. The viscosity of the fracture fluid in the formation must be reduced so that it can be expelled. This viscosity reduction is generally called "breaking" the thickener.

The viscosity of aqueous hydratable polymer solutions will break spontaneously over an extended period due to biological or thermal degradation, but lost production time makes it impractical to wait. Therefore, chemical accelerators called "breakers" are added to the fracture fluid to induce and control viscosity breaking. Commonly used breakers for low temperature wells include enzymes, acids, and oxidizing agents. Peroxygen compounds are preferred for high temperature wells. Peroxygens decompose into free radicals

that can break intermolecular polymer bonds in thickeners via a chain reaction mechanism; and they leave no objectionable decomposition residue.

Control of time to viscosity break is critical and has been intensively studied. Premature breaking can decrease the number and/or length of fractures, which reduces the effectiveness of the fracture operation. Too long a delay after fracture is undesirable because valuable production time is lost. Fracture operations take from about 30 minutes to eight hours to complete. After the treatment, the fluid may be expected to return to the surface in as early as 24 hours. Accordingly, break times ranging from four hours to 24 hours are required.

Breaktime is controlled primarily by selecting a peroxygen with a requisite rate of decomposition versus temperature profile and secondarily by the amount of peroxygen added to the fracture fluid. A characteristic of peroxygen compounds is that they are stable up to a critical temperature and then, as temperature is raised, they decompose over a temperature range, with the decomposition rate increasing exponentially with absolute temperature. Accordingly, a critical parameter in selecting a peroxygen for a specific well application is its decomposition temperature range; the peroxygen must decompose in the temperature range prevailing in the well. In addition, the concentration of peroxygen can be adjusted to control time to break—adding more breaker to reduce time to break—so that the thickener does not break until after the well fracture is completed, and the time to break is not unreasonably longer than the time to complete well fracture.

Commercial peroxygen breaker compounds include sodium perborate, sodium percarbonate, hydrogen peroxide, potassium diperphosphate, and the salts of monopersulfuric acid and dipersulfuric acid. Other suitable peroxygens include tertiarybutylhydroperoxide, potassium diperphosphate, and the ammonium and alkali metal salts of monopersulfuric acid and ammonium and alkali metal salts of dipersufuric acid.

For low temperature service, 80° F. to 140° F., an activator is commonly added to the fracturing fluid to induce decomposition of the breaker. The activator is usually a coordination compound comprising a ligand and a metal atom capable of existing in solution in two oxidation states. Desirable activators include tertiary amines, 9,10-orthophenanthroline ferrous sulfate complex (ferroin) and iron and copper complexes of catechol.

Currently, the industry is searching for breakers that work at the higher temperatures, 200° F. to 300° F., encountered in deeper wells. Group IA and IIA salts of the perphosphate ion have been proposed as high temperature breaker candidates because the perphosphate ion decomposes in the required temperature range:

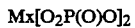

$M_x[O_2P(O)O]_2$ where X is 4 for a group 1A metal and 2 for a group IIA metal. Tetrapotassium perphosphate is one perphosphate salt currently proposed as a high temperature breaker. We, however, have discovered that perphosphate salts have deficiencies which preclude their use as high temperature breakers.

As previously discussed, at higher well temperatures exceeding 200° F., a potent crosslinker such as Ti or Zr is required to supplement the thickener. We have observed that when a group 1A or group 2A tetraphosphate salt is added to the fracture fluid, it complexes with metal crosslinkers to such an extent that the crosslinking effectiveness of the metal is significantly impaired. Accordingly, group IA and group 2A perphosphates are not suitable high temperature breakers.

Accordingly, there is need for a breaker for wells operating above 200° F. which timely and effectively breaks the fracture fluid viscosity and which is compatible with the metal crosslinkers added to high temperature fracture fluids.

RELATED ART

A general review of aspects of oil and gas well fracturing pertinent to this invention can be found in ACS Symposium Series 396, *Oil-Field Chemistry, Enhanced Recovery and Production Stimulation*, John K. Borchardt and Teh Fu Yen, Editors, Chapter 2 (1989).

U.S. Pat. 4,552,674 relates to fracture fluid compositions. It discloses use of peroxygens as breakers and, specifically, potassium diperphosphate. Starting in column 3, line 30 to line 43, the patent says:

any convenient peroxygen may be selected as the breaker. Usually it is desirable to use a relatively inexpensive peroxygen compound which will readily generate free radicals at the temperatures found in the formation. Desirable peroxygen compounds include sodium perborate, sodium carbonate peroxide, hydrogen peroxide, potassium diperphosphate and the salts of monopresulfuric acid and dipersulfuric acid. It is generally preferred to use peroxygens selected from the group consisting of hydrogen peroxide tertiary butylhydroperoxide, potassium diperphosphate, and the ammonium and alkali metal salts of monopersulfuric acid and ammonium and alkali metal salts of dipersulfuric acid.

Potassium diperphosphate is also disclosed in claim 1, column 11, lines 8 to 18, and claim 13, column 12, lines 12 to 23. The patent does not address the high temperature breaker problem nor interference with high temperature crosslinkers, which is the focus of the present invention.

U.S. Pat. 4,741,401 describes use of an aqueous fracturing fluid comprising controlled release capsules containing the breaker to control and/or delay the viscosity reducing activity of the breaker. However, in column 5, lines 52 to 63, the patent discloses that potassium perphosphate is a preferred oxidizing agent. The patent does not address the high temperature breaker problem nor interference with high temperature crosslinkers, which is the focus of the present invention, but encapsulation is an alternative way to control activity of breakers.

SUMMARY OF THE INVENTION

The present invention is a fracture fluid composition in which the viscosity breaker is an ester or amide of the perphosphate ion, or a mixture of esters or amides of the perphosphate ion. The radical of the ester or amide is preferably a methyl, ethyl, propyl, butyl, or aryl radical. Typically, the thickener is a polysaccharide or other suitable hydrolyzable polymer such as carboxymethylhydroxypropyl guar. Metal ions such as Ti or Zr are added to crosslink and further thicken the gel. Whereas salts of the perphosphate ion interfere with action of the crosslinkers, the esters and amides of perphosphate do not. Fracture fluids with ester or amide perphosphate breakers are useful for fracturing deeper crude oil and natural gas wells which operate at temperatures between 200° F. and 250° F. and which use metal ion crosslinkers such as Ti and Zr.

The present invention also relates to well fracturing processes which utilize fracture fluids containing an ester or amide perphosphate breaker. Perphosphate esters and amides decompose in the 200° F. to 300° F. well temperature range. Time to breaking is controlled in the range of 4 hours to 24 hours by adjusting the amount of breaker added to the fracture fluid, increasing breaker loading to reduce time to break.

DETAILED DESCRIPTION OF THE INVENTION

The perphosphate ion decomposes in the 200° F. to 300° F. temperature range, which makes it a candidate for breaking in deeper wells operating in that temperature range. Salts of the perphosphate ion, such as the Group IA and IIA salts, have been synthesized and tested as breakers. We determined that salts of perphosphate ion are not suitable high temperature breakers because they interfere with crosslinking activity of metal ion crosslinkers used in high temperature fracture fluid compositions.

However, esters of the perphosphate ion

R = alkyl or aryl radical and amides of the perphosphate ion:

R = alkyl or aryl radical should not interfere with crosslinking activity of metal ion crosslinkers, and they decompose in the desired 200° F. to 300° F. temperature range.

Alkyl radicals ranging from C1 to C10 are preferred. Aryl radicals with one to three alkyl groups on the phenyl ring ranging from C1 to C3 are preferred. Most preferred radicals include methyl, ethyl, propyl, butyl, and aryl radicals. The breaker may be a mixture of esters or amides of the perphosphate ion.

Without intending to limit the scope of this invention, we hypothesize that the ester and amide groups will form a covalent bond with the perphosphate ion which will shield the perphosphate and impede the perphosphate ion from complexing with the metal crosslinker ions. The decomposition rate vs. temperature curve for perphosphate esters and amides are not expected to differ significantly from the decomposition function for the perphosphate salts.

The perphosphate esters and amides specified in this invention, while not yet produced on large commercial scale, can be synthesized by methods well-known to chemists.

The following examples are provided to elucidate the invention and should not be construed to limit the scope of the invention. The perphosphate used in Examples 1 and 2 which follow was the salt tetrapotassium perphosphate (TKP). The results of Examples 1 and 2 show that tetrapotassium perphosphate is an effective fracturing fluid viscosity breaker except that TKP interferes with the commercial high temperature crosslinking agents such as zirconium. Example 3 is presented to show how to employ an ester or amide of the perphosphate radical in a fracturing fluid so as to utilize the viscosity breaking capability of the perphosphate radical while avoiding the cross linking interference associated with perphosphate salts.

EXAMPLE 1

Perphosphate loadings required to break viscosity were determined using the Static Break test. In a Static Break test, a fracture fluid is heated to test temperature, in this case 200° F., in a viscometer such as the "BAROID" Model 35 A viscometer. A measured amount of perphosphate is added to the fracture fluid and the time elapsed until the viscosity break is recorded. The breakpoint is defined as the time when the viscometer first gives a measurable viscosity reading. Viscometer shear rate for the test is standardized at 511 reciprocal seconds. The fracture fluids tested were carboxymethylhydroxypropyl guar (CMHPG). The fluids were crosslinked with a Zr crosslinker before the breaker was added by holding the fluid at 200° F. for one hour with a Zr lactate crosslinker before the breaker was added.

The perphosphate was the salt, tetrapotassium perphosphate (TKP).

TKP loading of 2 lb/Mgal was insufficient to break the fluids. The fluid did break at a TKP loading of 6 lb/Mgals. Moreover, the fluid did not re-thicken when cooled to room temperature.

Additional static break tests were performed with CMHPG fluid at 180° F., 200° F., and 225° F. TKP loadings varied between 0 and 5 lbs/Mgal. Results are reported in TABLES 1 to 3.

TABLE I

Static Break Test With TPK in a CMHPG Fluid at 180° F.

| Time (hours) | lb TPK/Mgal Apparent Viscosity (CP) at 511 s$^{-1}$ | | | | |
|---|---|---|---|---|---|
| | 0 | 0.5 | 1.0 | 2.0 | 5.0 |
| 0.5 | C/L | C/L | C/L | C/L | C/L |
| 1 | C/L | C/L | C/L | C/L | WC/L |
| 2 | C/L | C/L | C/L | C/L | 4 |
| 4 | C/L | C/L | C/L | C/L | 2 |
| 6 | C/L | C/L | C/L | C/L | — |
| 24 | C/L | C/L | C/L | C/L | — |
| cool down | C/L | C/L | C/L | C/L | 12 |
| pH final | 9.95 | 9.97 | 9.78 | 9.66 | 10.14 |

*C/L = crosslinked
WC/L = weakly crosslinked

TABLE II

Static Break Test With TPK in a CMHPG Fluid at 200° F.

| Time (hours) | lb TPK/Mgal Apparent viscosity (cP) at 511 s$^{-1}$ | | | | |
|---|---|---|---|---|---|
| | 0 | 2.0 | 3.0 | 4.0 | 5.0 |
| 0.5 | C/L | C/L | C/L | C/L | C/L |
| 1 | C/L | C/L | C/L | C/L | WC/L |
| 2 | C/L | C/L | C/L | 6 | 3 |
| 3 | C/L | C/L | WC/L | 4 | 2 |
| 4 | C/L | C/L | WC/L | — | — |
| 6 | C/L | C/L | WC/L | — | — |
| 8 | C/L | C/L | WC/L | — | — |
| 24 | C/L | C/L | 6 | 2 | 2 |
| cool down | C/L | C/L | C/L | C/L | 5 |
| pH final | 9.94 | 9.70 | 9.57 | 9.53 | 9.52 |

*C/L = crosslinked
WC/L = weakly crosslinked

TABLE III

Static Break Test With TPK in a CMHPG Fluid at 225° F.

| Time (hours) | lb TPK/Mgal Apparent viscosity (cP) at 511 s$^{-1}$ | | | |
|---|---|---|---|---|
| | 0 | 2 | 3 | 5 |
| 6 | C/L | C/L | 6.5 | 1.5 |
| 24 | C/L | C/L | 5.0 | — |
| cool down | C/L | C/L | 5.0 | 2.5 |
| pH final | 9.95 | 9.83 | 9.63 | 10.11 |

*C/L = crosslinked
WC/L = weakly crosslinked

At 180° F., only the 5 lbs/Mgal loading broke the fluid; break-time was two hours. At 200° F., loadings of 3, 4, and 5 lbs of TKP per Mgals broke the fluid, but only the 5 Lb/Mgal loading did not re-thicken upon cooling to room temperature. At 225° F., the 3 and 5. Lbs/Mgal loadings broke the fluid with no re-thickening at room temperature.

These results verify that the perphosphate salt is a suitable breaker for fracture fluids operating at 200° F. to 250° F.

The data also indicate that increasing ester or amide perphosphate concentration will reduce time to viscosity break and reducing ester or amide perphosphate concentration will increase time to viscosity break, and that the lower the mean temperature in the subterranean formation to be cracked the more ester or amide perphosphate will be required in the fracturing fluid to achieve a specified time to viscosity break.

EXAMPLE 2

Interactions between TPK and crosslinkers were investigated using the Vortex Closure Time test. The test fracture fluid used was Zr crosslinked CMHPG, a commercial fracture fluid. The Vortex Closure Time test consists of mechanically agitating the fracture fluid at the specified temperature in an open vessel to induce a vortex at the surface. The time it takes for the vortex to disappear is a measure of the effectiveness of the crosslinker for raising viscosity—the shorter the time, the more effective the crosslinker. To the extent that TPK lengthens time to vortex closure, TPK interferes with crosslinking. Results of various TPK loadings are reported in Table 4.

TABLE 4

| Effect of TRK on Vortex Closure Time of a CMHPG Fluid | |
|---|---|
| Loading lb. TRK/Mgal | Vortex Close Time (seconds) |
| 0 | 19 |
| 0 | 19 |
| 0.1 | 126 |
| 0.5 | >300 |
| 3.0 | >300 |

An effect on vortex closing is noticeable at TPK loading as low as 0.1 lb of TPK per thousand gallons of fluid: vortex time increased from 19 seconds with no TPK to 126 seconds. At 0.5 lbs/Mgal, TPK loading vortex time exceeded five minutes. This indicates that perphosphate salts are not suitable as breakers in commercial high temperature fracture fluids because they interfere with crosslinking.

EXAMPLE 3

Following is the procedure used for formulating the fracture fluid designated as CMHPG in the previous examples. It is typical of, but not necessarily the best, high temperature fracture fluids in current commercial use: The fluid is prepared by dissolving 20 g of KCl (2%) in 980 g of water contained in a "WARRING" blender jar. The fluid is stirred at a rate to allow for a ½" to 1" vortex to form. The gelling agent, carboxymethyl-hydroxypropyl-guar 4.2 grams (35 lb./Mgal loading), is added to the KCl water and dispersed. Sufficient acetic acid is added to decrease the pH of the fluid to 6.5. After allowing the gelling agent to fully hydrate by stirring for at least 30 minutes, 0.7 mL of a zirconium lactate crosslinker is added to the fluid.

To produce a fracture fluid as specified in the present invention, a perphosphate ester or perphosphate amide is added to the fluid. The perphosphate ester or amide loading used depends on the temperature in the well and time to complete the fracture operation. Typical loadings will range from one to ten lbs/Mgal of fluid: to fracture a formation at 200° F. that is estimated to take 4 hours to complete will require a perphosphate loading of about 10 Lbs/Mgal of fluid; to fracture a formation at 300° F. that is estimated to take four hours to complete will require a perphosphate loading of about one lb/Mgal of fluid; to fracture a formation at 250° F. estimated to take 12 hours to complete will require a perphosphate loading of about five Lbs/Mgals. At any given formation temperature, higher loadings reduce breaktime. At any fracture time, the higher the formation temperature, the less perphosphate loading is required.

No modifications to current well fracture operating procedure and practice are required to accommodate fracture fluids containing ester or amide perphosphate breakers.

What is claimed is:

1. A method for fracturing subterranean formations penetrated by a well bore comprising the step of:
pumping a fracture fluid down the well bore at a pressure and rate of flow sufficient to fracture the subterranean formation, wherein the fracturing fluid comprises water, a polysaccharide viscosifier, a polysaccharide crosslinking agent, and a viscosity breaker selected from the group consisting of perphosphate esters $\{(RO)_2P(O)O\}_2$ in which R is an alkyl or aryl radical and perphosphate amides $\{(R_2N)_2P(O)O\}_2$ in which R is an alkyl or aryl radical.

2. The method of claim 1, wherein the alkyl radical R is selected from the group consisting of methyl, ethyl, propyl and butyl radicals.

3. The method of claim 1, wherein the polysaccharide viscosifier is carboxymethylhydroxypropyl guar.

4. The method of claim 1, wherein the fracturing fluid comprises a propping agent.

5. The method of claim 1, wherein the polysaccharide crosslinking agent-is selected from the group consisting of Cr(VI), Cr(III), borate radical, Sb(V), Sb(III), Ti(IV), Al(III) and Zr(IV).

6. The method of claim 1, wherein the formations are at temperatures in the range of from about 200° F. to about 300° F.

7. The method of claim 6, wherein the mean temperature in the subterranean formation to be fractured is determined and the concentration of the viscosity breaker in the fracturing fluid is made higher the lower the mean temperature in the formation being fractured.

8. The method of claim 1, wherein the the time required to complete the fracturing of the subterranean formation is specified and the concentration of the viscosity breaker in the fracturing fluid is made higher the shorter the time required to fracture the formation.

* * * * *

UNITED STATES PATENT AND TRADEMARK OFFICE
CERTIFICATE OF CORRECTION

PATENT NO.: 5,386,874

DATED: February 7, 1995

INVENTORS: Laramay et al.

It is certified that errors appears in the above-identified patent and that said Letters Patent is hereby corrected as shown below:

Column 3, line 18, delete "dipersufuric" and insert --dipersulfuric-- therefore.

Column 6, line 59, delete "." after "3 and 5".

Signed and Sealed this

Twenty-third Day of May, 1995

Attest:

BRUCE LEHMAN

Attesting Officer        Commissioner of Patents and Trademarks